March 4, 1941.  R. O. WISE  2,233,860
MODULATING SYSTEM
Filed April 27, 1939  2 Sheets-Sheet 1

INVENTOR
R. O. WISE
BY H. O. Burgess
ATTORNEY

March 4, 1941.  R. O. WISE  2,233,860
MODULATING SYSTEM
Filed April 27, 1939  2 Sheets-Sheet 2
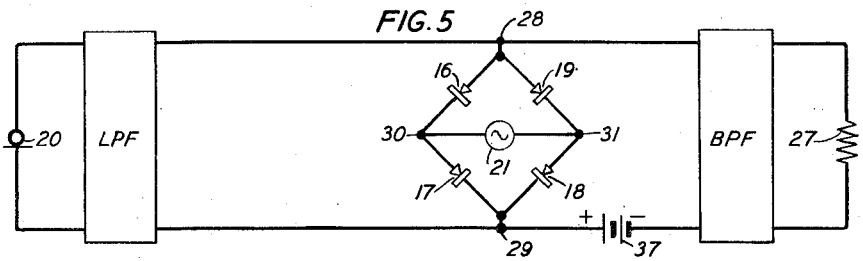
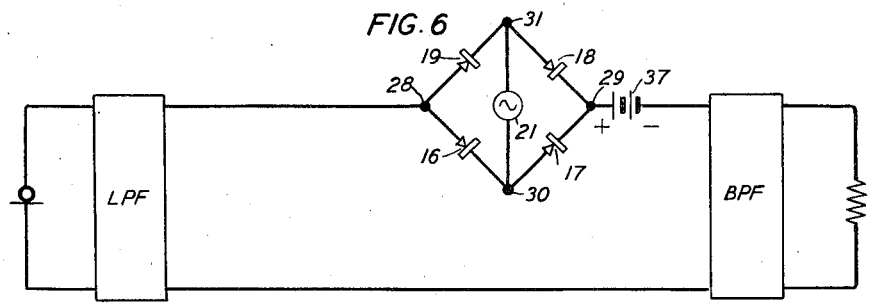
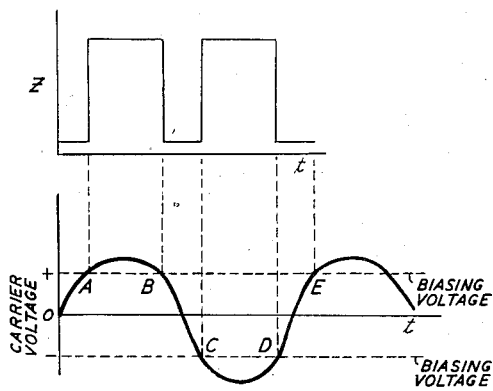
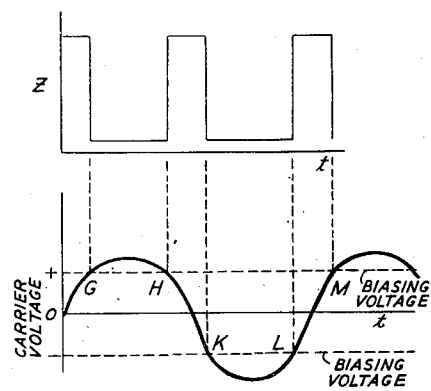
INVENTOR
R. O. WISE
BY H. A. Burgess
ATTORNEY Patented Mar. 4, 1941

2,233,860

UNITED STATES PATENT OFFICE 2,233,860

MODULATING SYSTEM

Raymond O. Wise, East Orange, N. J., assignor to Bell Telephone Laboratories, Incorporated, New York, N. Y., a corporation of New York Application April 27, 1939, Serial No. 270,302

5 Claims. (Cl. 179—171.5)

This invention relates to frequency changers which may be either modulators, demodulators or detectors for use in signaling transmission systems, and, more particularly, to such frequency changers embodying rectifiers of the dry surface contact type.

Systems of the kind to which this invention relates comprise a source of signaling currents, a load circuit and means interposed therebetween so as to generate and control a current of desired form in the load circuit. Such system is often referred to as a frequency changer, due to the fact that the input and output circuits contain currents of different frequencies. In accordance with this invention, suitable coupling of a variable nature provided between the signaling source and the load effectively regulates the frequency change and controls the amplitude of the output current in accordance with the signaling variations and accomplishes this with a minimum loss of energy, thereby promoting high efficiency in the frequency change.

It is an object of the invention to perform in such frequency changers the frequency change with economy.

It is another object to minimize in such systems the loss of energy.

It is a further object of the invention to obtain in such systems the suppression of certain frequencies.

In accordance with the invention, improved coupling arrangements embody a plurality of rectifiers of the dry surface contact type arranged in the form of a bridge which has one diagonal connected to the signaling source and load circuit. The conductive or non-conductive condition of the bridge is varied preferably in an abrupt manner by a carrier source connected to the opposite diagonal of the bridge and supplemented by a biasing means. The resulting variation of coupling may be such that the signaling source and the load are alternately coupled to and decoupled from each other, as the variation may cause phase reversals of the coupling, or any desired variation. In many instances it is to be preferred that the circuits be substantially decoupled during the greater part of the carrier cycle, the coupling taking effect during only a very small portion of the cycle. An impulsive excitation of the load is thus effected, the signaling source acting upon the load through the coupling in an intermittent manner. During the intervening periods, interaction with its attendant energy dissipation is prevented.

A feature of the invention is the use of a carrier voltage considerably greater than the signaling voltage so that the carrier voltage substantially controls the rectifiers, causing them to act as voltage operated switches or commutators at periodic intervals determined by the carrier frequency. Another feature is the use of a biasing means of large voltage compared with that of the signaling source, but less than the maximum carrier voltage. By adjustment of the voltages, the excitation of the load circuit through the rectifier may be confined to whatever fractional part of the carrier cycle may be found to accompany the highest efficiency under practical conditions. Other features relate to a full-wave rectifying arrangement of the dry surface type for use as a modulator, and combinations of rectifiers acting in regular rotation to produce an output wave of twice the carrier frequency, that is, for third order modulation.

The invention will be more readily understood from the following detailed description taken together with the accompanying drawings, in which:

Fig. 5 is still another form of biased rectifier used as a third order modulator;

Fig. 6 is a modification of Fig. 5;

Fig. 7 is a curve explaining the action in Figs. 1 through 4; and

Fig. 8 is a curve explaining the action in Figs. 5 and 6.

The same reference numerals are utilized to identify identical elements appearing in the several figures.

Figure 1:
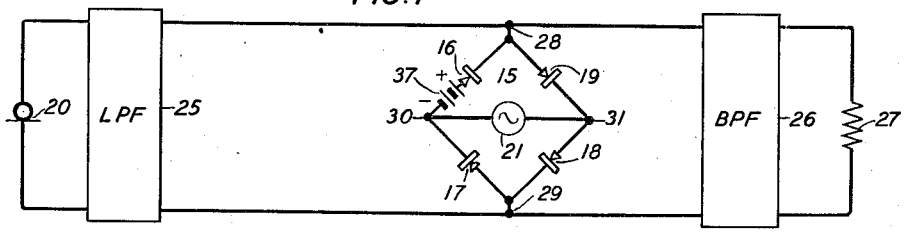
Fig. 1 shows biased rectifiers used as a third order modulator.

Fig. 1 shows a third order modulating system in which a bridge 15 embodying rectifiers 16, 17, 18 and 19 of the dry surface contact type is connected in shunt relation to a signal source 20 and a carrier source 21. A filter 25 adapted to pass the signal frequencies is disposed between the signal source and the bridge. Also, an output filter 26 is connected between the bridge and a load 27 to select a desired output wave. The leads connecting the filters are joined to terminals 28 and 29, both of which lie in the vertical diagonal of the bridge.

The left-hand side of the bridge 15 comprises rectifiers 16 and 17, both of which have a common terminal 30 and are so poled that rectifier 16 is conductive in a direction away from the common terminal 30 while rectifier 17 is conductive in a direction toward the common terminal 30, as indicated by the arrowheads. The right-hand side of the bridge 15 includes rectifiers 18 and 19, both of which have a common terminal 31 and are so poled that the rectifier 18 is conductive in a direction away from the common terminal 31 while the rectifier 19 is conductive in a direction toward the common terminal 31, as indicated by the arrowheads. Thus, the rectifiers in the bridge are so poled as to cause therein in a clockwise direction a flow of current from a biasing source 37 which is embodied in one arm of the bridge.

A carrier source 36 is connected between the terminals 30 and 31 which lie in the horizontal diagonal of the bridge 15. The pair of terminals 30 and 31 and the pair of terminals 28 and 29 are conjugately related, the carrier source and load circuits appearing in the respective conjugate branches.

In the operation of the system in Fig. 1, the biasing voltage is adjusted to a value above the signaling voltage and below the carrier voltage. Signaling currents from the source 21 tend to establish alternating voltages of signaling frequency across the terminals 28 and 29. At the same time, carrier currents from the source 21 tend to establish alternating voltages of carrier frequency across the terminals 30 and 31. When, for example, positive carrier current flows in a left-hand direction in a circuit embodying terminal 30, rectifier 16, terminal 28, rectifier 19 and terminal 31, the positive carrier voltage produced thereby does not affect the conductivity of the rectifiers 16 and 19, regardless of the magnitude of the carrier voltage as the latter is in an aiding direction relative to the biasing voltage. When this positive carrier current tends to flow in a circuit comprising terminal 30, rectifier 17, terminal 29, rectifier 18 and terminal 31, the positive carrier voltage caused thereby does affect the conductivity of rectifiers 17 and 18, depending on whether such carrier voltage is less or greater than the biasing voltage, as the carrier voltage opposes the biasing voltage.

So long as the carrier voltage is less than the biasing voltage, a condition of conductivity or low impedance is established in the rectifiers 17 and 18. Hence, a similar condition is also established across the terminals 28 and 29. As a consequence, the bridge serves as a low impedance shunt for signaling currents whereby the latter are precluded from being transmitted to the load. Thus, in Fig. 7 it is seen that such low impedance condition exists for a positive carrier voltage OA. When, however, the carrier voltage exceeds the biasing voltage, the condition of conductivity in the rectifiers 16 and 19 is continued and a condition of non-conductivity or high impedance is established in the rectifiers 17 and 18. Hence, a similar condition is also established across the terminals 28 and 29. Now, a high impedance condition exists in the bridge so that signaling currents are transmitted to the load. Thus, it is seen in Fig. 7 that such high impedance condition exists for a positive carrier voltage AB.

In Fig. 7, as the carrier voltage passes from a value indicated by the point B and swings in a negative direction to a value represented by the point C, it is again less than the biasing voltage. Hence, a condition of conductivity or low impedance is reestablished in the rectifiers 17 and 18 and thereby a similar condition across the terminals 28 and 29. As previously seen, such condition causes a shunting of signaling currents across the system. The carrier voltage in passing between the values indicated by the points C and D again exceeds the biasing voltage to reestablish the non-conductive or high impedance condition in the rectifiers 17 and 18 and thereby a similar condition across the terminals 28 and 29. As previously seen, such condition enables a transmission of signaling currents to the load. The carrier voltage in passing between the values represented by the points D and E is again less than the biasing voltage. Consequently, a conductive or low impedance condition is reestablished across the terminals 28 and 29 so as to shunt signaling currents across the system.

Thus, when the carrier voltage is less than the biasing voltage, signaling currents are shunted across the system, and when the carrier voltage is greater than biasing voltage, signaling currents are transmitted to the load.

Accordingly, when the carrier voltage is less than the biasing voltage, a condition of low impedance is established in the bridge, and when the carrier voltage is greater than the biasing voltage, a condition of high impedance is established in the bridge. Since the high impedance condition occurs twice for each cycle of carrier voltage, there is effected third order modulation. In other words, the frequency of the signaling wave is varied at a rate which is twice the frequency of the carrier wave. In Fig. 1 the carrier wave is suppressed and the second harmonic of the carrier wave does not appear in the load. The suppression of such waves is particularly important in multichannel systems so as to avoid possible interference between carrier frequencies high in the frequency spectrum and the channels utilizing frequencies of the order of the carrier frequencies. In the absence of this suppression, use of expensive filters may be necessary to obviate such interference.

In Fig. 1, when positive carrier current flows in a right-hand direction, the positive carrier voltage produced thereby does not alter the conductive or low impedance condition of rectifiers 17 and 18 regardless of the value of carrier voltage relative to the biasing voltage. This condition also exists in the rectifiers 16 and 19 so long as the carrier voltage is less than the biasing voltage. When, however, the carrier voltage exceeds the biasing voltage, the non-conductive or high impedance condition is established in the rectifiers 16 and 19. As indicated in Fig. 7, the non-conductive or high impedance condition is established in the rectifiers 16 and 19 and, therefore, is extended across the terminals 28 and 29 twice for each cycle of carrier voltage. Consequently, the transmission of signaling waves to the load is interrupted at a rate which is twice the frequency of the carrier wave as mentioned above.

Figure 2:
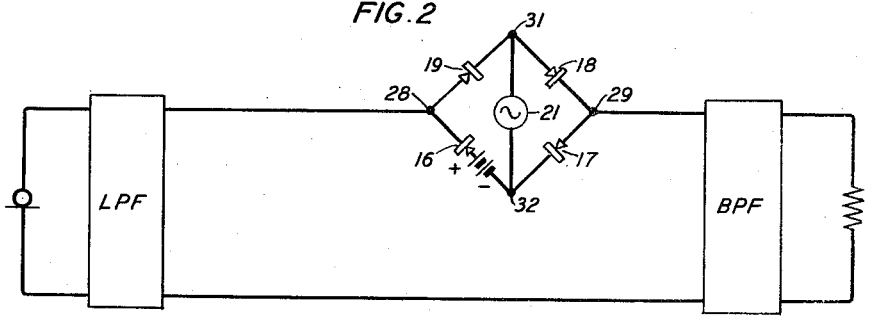
Fig. 2 is a modification of Fig. 1.

Fig. 2 illustrating a modification of the system in Fig. 1 interrupts the signaling current by abruptly varying the impedance across the terminals 28 and 29, both of which are serially connected in one side of the system between the low-pass and high-pass filters. The configuration of the bridge is identical with Fig. 1 and, as therein, a non-conductive or high impedance condition is alternately established in the pair of rectifiers 16 and 19 and the pair of rectifiers 17 and 18 as the carrier voltage varies relative to the biasing voltage at the rate shown in Fig. 7. In Fig. 2 it is to be understood that the low-pass and high-pass filters have low impedance outside of their respective bands so as to enable a circulation of the signaling and modulated waves in the system.

Figure 3:
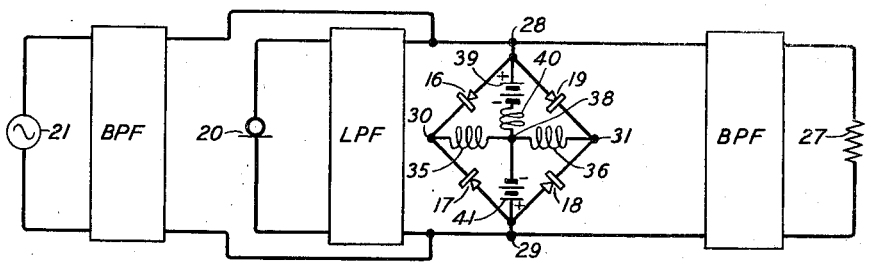
Fig. 3 is another form of biased rectifier used as a third order modulator.

Fig. 3 shows a third order modulating system in which a bridge embodying rectifiers 16, 17, 18 and 19 is connected between the signaling source 20 and the load circuit 27. A low-pass filter LPF for passing the signaling frequencies is interposed between the signaling source and the bridge while a band-pass filter BPF for passing the desired band of modulated frequencies is connected between bridge and the load, both filters being connected across the terminals 28 and 29 comprising the vertical diagonal of the bridge. The left-hand pair of rectifiers 16 and 17 has a common terminal 30 and the right-hand pair of rectifiers 18 and 19 has a common terminal 31, and the rectifiers of each pair are so poled that each thereof is conductive toward the common terminal as indicated by the direction of the arrowheads. A carrier source 21 is also connected across the terminals 28 and 29 and a filter BPF for passing carrier frequencies is interposed between these terminals and the carrier source. Extending between the horizontal terminals 30 and 31 in series is a pair of choke coils 35 and 36 having a common terminal 38. In the upper half of the vertical diagonal is a battery 39 which has its positive terminal connected to the bridge terminal 28 and its negative terminal through a choke coil 40 to the common terminal 38. In the lower half of the vertical diagonal is a battery 41 which has its negative terminal connected to the common terminal 38 and its positive terminal to the bridge terminal 29. Normally, current from biasing battery 39 flows in a circuit comprising bridge terminal 28, rectifier 16, bridge terminal 30, choke coil 35, common terminal 38 and choke coil 40 and also in a circuit comprising bridge terminal 28, rectifier 19, bridge terminal 31, choke coil 36, common terminal 38 and choke coil 40. Normally, current from biasing battery 41 flows in a circuit including bridge terminal 29, rectifier 17, bridge terminal 30, choke coil 35 and common terminal 38 and also in a circuit embodying bridge terminal 29, rectifier 18, bridge terminal 31, choke coil 36, and common terminal 38. Thus, conditions of low impedance are normally established in the respective pairs of rectifiers.

In the operation of Fig. 3, both signaling and carrier currents applied simultaneously to the terminals 28 and 29 tend to establish thereacross alternating voltages of the respective frequencies. A positive carrier current flowing in a downward direction in the aforementioned individual circuits embodying the rectifiers 16 and 19 produces a carrier voltage which does not alter the conductive or low impedance condition of these rectifiers irrespective of the relative values of the carrier and biasing voltages. This carrier current tending to flow in the aforementioned individual circuits, including the rectifiers 17 and 18, effects positive carrier voltage which, when less than the voltage of the biasing source 41, does not impair the conductive or low impedance condition of rectifiers 17 and 18 and which, when greater than the voltage of biasing source 41, establishes a non-conductive or high impedance condition in rectifiers 17 and 18. Likewise, a positive carrier current flowing in an upward direction in the aforementioned individual circuits incorporating the rectifiers 17 and 18 causes a positive carrier voltage that does not alter the conductive or low impedance condition of these rectifiers regardless of the relative values of the carrier and biasing voltages. This carrier current, however, tending to flow in the aforementioned discrete circuits embodying rectifiers 16 and 19 produces a positive carrier voltage which, when less than the voltage of biasing source 40, in no wise impairs the conductive or low impedance condition of the rectifiers 16 and 19 and which, when greater than the voltage of biasing source 40, establishes a non-conductive or high impedance condition in the rectifiers 16 and 19. Such non-conductive or high impedance condition is alternately established in the pair of rectifiers 17 and 18 and in the pair of rectifiers twice for each cycle of carrier waves, as shown in Fig. 7 and described above relative to Fig. 1. Choke coil 40 serves to prevent a shunting of the signaling and carrier currents through the biasing sources 40 and 41.

Figure 4:
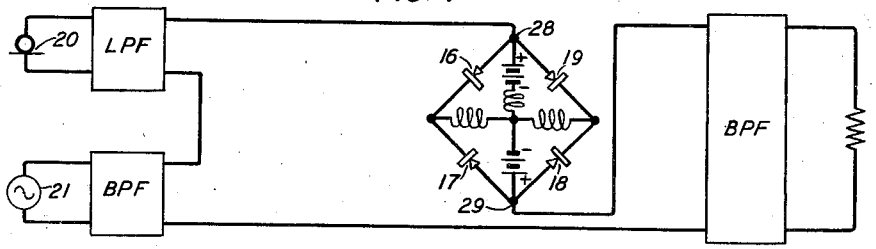
Fig. 4 is a modification of Fig. 3.

Fig. 4, illustrating a modification of the system in Fig. 3, interrupts the signaling current by abruptly varying the impedance across terminals 28 and 29, both of which are serially connected in one side of the system between the low-pass and high-pass filters. The configuration of the bridge is the same as in Fig. 3 and, as therein, a non-conductive or high impedance condition is alternately established in the pair of rectifiers 16 and 19 and the pair of rectifiers 17 and 18 as the carrier voltage varies relative to the biasing voltage at the rate shown in Fig. 7. In Fig. 4 it is to be understood that carrier, low-pass and band-pass filters have low impedance outside of their respective bands so as to enable a circulation of the several waves in the system.

Fig. 5 shows a third order modulating system which is similar to Fig. 1 except that, of the left-hand pair of rectifiers, the rectifier 16 is poled in a conductive direction toward the common terminal 30 and the rectifier 17 is poled in a direction away from the common terminal 30, and, of the right-hand pair of rectifiers, the rectifier 19 is poled in a direction toward the common terminal 31 and the rectifier 18 is poled away from the common terminal 31. A voltage from the biasing source 37 serves to normally establish a non-conductive or high impedance condition in all rectifiers of the bridge. It is to be understood that the circuit for the biasing current is completed through the band-pass filter and, further, the low-pass filter blocks biasing current from circulating in the signaling circuit.

In the operation of Fig. 5, a positive carrier current flowing in a left-hand direction from the source 21 produces a carrier voltage which does not affect the normal non-conductive or high impedance condition in all rectifiers so long as the carrier voltage is less than the biasing voltage. Thus, in Fig. 8 it is seen that such condition exists for a carrier voltage OG. Hence, signaling currents are transmitted to the load. As this carrier voltage exceeds the biasing voltage, a conductive or low impedance condition is established in all rectifiers and extends across the terminals 28 and 29. Therefore, in Fig. 8 it is observed that such condition is established for a carrier voltage GH. Consequently, signaling currents are shunted across the system. For carrier voltages HK and KL, the conditions of high impedance and low impedance are respectively reestablished in all rectifiers. For a carrier voltage LM, the high impedance condition is again established in all rectifiers. Thus, the low and high impedance conditions are alternately established in all rectifiers as the carrier voltage varies relative to the biasing voltage at the rate shown in Fig. 8, that is, each condition occurs twice for each cycle of carrier waves.

Fig. 6, illustrating a modification of the system in Fig. 5, interrupts the signaling currents by abruptly varying the impedance across terminals 28 and 29, both of which are serially connected in one side of the system between the low-pass and high-pass filters. The configuration of the bridge is such that rectifiers 16 and 19 are poled away from the common terminal 28 while rectifiers 17 and 18 are poled toward the common terminal 29. In Fig. 6, the circuit for biasing current extends through the low-pass and high-pass filters, both of which, it is understood, have low impedance outside of their respective bands to provide for the circulation of the various waves. As in Fig. 5, the low and high impedance conditions are alternately established in all rectifiers as the carrier voltage varies relative to the biasing voltage at the rate shown in Fig. 8, that is, each condition takes place twice for each cycle of carrier waves.

What is claimed is:

1. A third order modulating system comprising a plurality of rectifiers arranged in the form of a bridge, a source of biasing voltage connected in one arm of the bridge, the rectifiers being so poled as to allow current from the biasing source to flow in the bridge in a closed loop, a signaling source, a load circuit, the signaling source and load circuit being connected to one diagonal of the bridge, and a carrier source being connected to the other diagonal of the bridge, the magnitude of the biasing voltage being of a value less than the carrier voltage and greater than the signaling voltage.

2. A third order modulating system comprising a plurality of rectifiers arranged in the form of a bridge and being so poled that each rectifier is flanked by two adjacent rectifiers whose conductive directions are the same around the bridge, a source of biasing voltage so connected to the bridge that current therefrom flows in the bridge in a closed loop, a signaling source, a load circuit, the signaling source and load circuit being connected to the vertical diagonal of the bridge, and a carrier source being connected to the bridge in conjugate relation to the load circuit, the magnitude of the biasing voltage being of a value less than the carrier voltage and greater than the signaling voltage.

3. A third order modulating system comprising a bridged network of rectifiers, a signaling source, a load circuit, the signaling source and the load circuit being connected together to one diagonal of the bridge, a carrier source connected to the other diagonal of the bridge, and a source of biasing voltage connected in one arm of the bridge, each of the rectifiers being so poled as to allow current from the biasing source to flow only in the bridge so that the initial resistance of the rectifiers is controlled by the voltage of the biasing source.

4. A third order modulating system comprising at least four rectifiers connected in the form of a bridge, a source of biasing voltage connected in one arm of the bridge, the rectifiers being so poled as to allow current from the biasing source to flow in the bridge in a closed loop, a signaling source, a load circuit, the signaling source and the load circuit being connected in parallel to one diagonal of the bridge, and a carrier source connected to the other diagonal of the bridge, the magnitude of the biasing voltage being of a value less than the carrier voltage and greater than the signaling voltage.

5. A third order modulating system comprising at least four rectifying elements connected in the form of a bridge, a source of biasing voltage connected in one arm of the bridge, the rectifying elements being so poled as to allow current from the biasing source to flow in the bridge in a closed loop, a signaling source, a load circuit, the signaling source and the load circuit being connected in series to one diagonal of the bridge, and a carrier source being connected to the other diagonal of the bridge, the magnitude of the biasing voltage being of a value less than the carrier voltage and greater than the signaling voltage.

RAYMOND O. WISE.